Jan. 10, 1950   R. J. IMBERT   2,494,178
GAS TURBINE
Filed Aug. 27, 1945
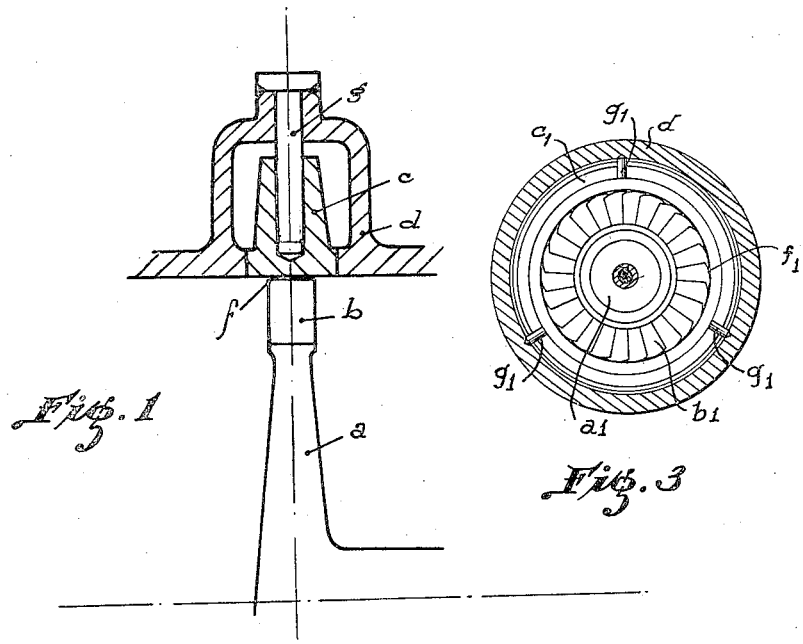
Fig. 1
Fig. 3
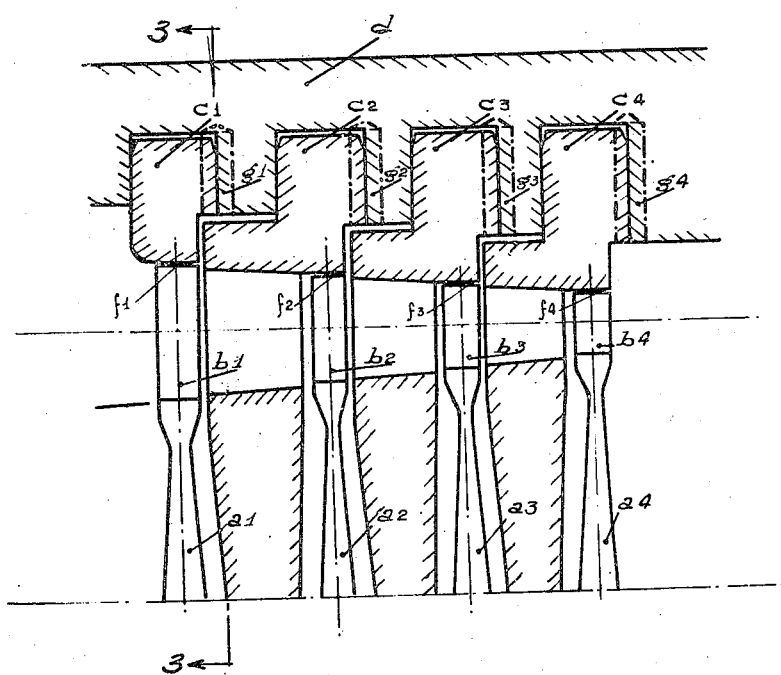
Fig. 2
INVENTOR
Roger J. Imbert
By Watson, Cole, Grindle & Watson Patented Jan. 10, 1950

2,494,178

UNITED STATES PATENT OFFICE 2,494,178

GAS TURBINE

Roger Jean Imbert, Paris, France, assignor to Societe Rateau (Societe Anonyme), Paris, France, a company of France, and Rene Anxionnaz, Paris, France Application August 27, 1945, Serial No. 612,869
In France May 21, 1943

Section 1, Public Law 690, August 8, 1946
Patent expires May 21, 1963

2 Claims. (Cl. 253—65)

It is known that the blades of gas turbine wheels, exposed to high temperatures, must be designed with a view to reducing to a minimum mechanical restraints. In these circumstances, it is of interest to provide movable blades without root or loose strip at the periphery, but this method of construction requires as small a play as possible between the periphery of the blade wheel and the fixed ring, assuring the external limitation of the gaseous jet.

It is necessary moreover that the play thus obtained should be maintained substantially constant under all operating conditions and that in particular, whether on starting, or stopping, or changes in operating conditions, the play is not reduced to such an extent that good operation of the turbine is compromised.

The present invention relates to an improvement in gas turbines with a view to satisfying these requirements.

According to the invention there is disposed between wheel and stator a ring in one or two parts adapted to maintain a play substantially constant at the periphery of the movable wheel of the turbine under all conditions of operation, this ring or these half-rings, the thermal inertia of which is preferably proportioned to that of the movable wheel, being separate from the fixed stator and capable of expanding freely in a radial direction.

The following description with reference to the accompanying drawing, given by way of non-limiting example, will explain how the invention may be constructed.

Fig. 1 is an elevational view, in cross section, illustrating a method of applying the invention to a single gas turbine wheel. Fig. 2 is an elevational view, in cross section illustrating a method of applying the invention to several successive stages of a multicellular gas turbine.

Figure 3 is a transverse sectional view taken substantially on the line 3—3 of Figure 2.

In the gas turbine wheel illustrated in Fig. 1, $a$ is the body of the movable wheel, provided with blades $b$, the device comprises in conformity with the invention a ring $c$ separate from the fixed stator $d$. The ring $c$ has a small play $f$ relatively to the periphery of the blade wheel $a$, $b$. According to the invention, the ring $c$ is given, by calculation or experimentally, a mass proportioned to that of the blade wheel in order to obtain, taking into account their respective speeds of heating and cooling, expansions or contractions which are equal as a function of time.

According to the invention the ring $c$ is likewise provided so that its radial expansion is free, but it comprises however a guiding device in order that it may remain constantly concentric to the movable wheel.

This guiding device may be constituted either by spindles $g$ soldered to the body of the fixed stator $d$, or by stops, pins or any other analogous device. Fig. 1 shows a guiding device by spindles $g$ freely engaged in borings of the ring $c$ with a play between the ring and the end of the said spindles in order to permit expansions of the ring. The number of guides will be at least three per ring or per half ring if the machine has a horizontal joint, in order to maintain the necessary concentricity of the ring or ring part $c$. This latter may likewise carry the distributing or directing vanes above or below the vanes of the wheel considered.

Fig. 2 illustrates the application of the invention to a gas turbine having a number of expansion stages. The wheels $a_1$, $a_2$, $a_3$ carrying at the periphery the blades $b_1$, $b_2$, $b_3$ are each surrounded by a ring $c_1$, $c_2$, $c_3$ with small plays $f_1$, $f_2$, $f_3$. The radial expansion of the rings $c_1$, $c_2$, $c_3$ remains free but is constantly guided by stops $g_1$, $g_2$, $g_3$, provided between the rings and the stator in order that the rings remain always concentric to the movable wheels. As will be observed from Figure 3, stops $g_1$, $g_2$, $g_3$, $g_4$ are constituted by radially directed pins, the pins lying in opposed recesses formed in the contiguous radial faces of the stator and each of the several rings or shrouds $c_1$, $c_2$, $c_3$, and $c_4$. The mass of each one of the rings is proportioned to that of the movable blade wheel with which it is associated and to the possible variations in temperatures at different working conditions for the stage considered.

What I claim is:

1. In a gas turbine having a plurality of rotor wheels each comprising a single set of radially extending blades each secured at its root to said wheel and free at its external tip, whereby the channels defined between said blades are open at the wheel periphery between the free tips of the blades; a stator provided with an annular recess around each said wheel; a separate stationary ring for each said wheel, a portion of each of said rings having a cylindrical smooth inner surface surrounding the free tips of the blades of the said wheel with only a slight radial clearance, and being adjacent to each other, and a root portion slidably mounted in said recess; nozzle diaphragms between said wheels, said diaphragms being supported from said stator with radial clearance between each said diaphragm and said stator; and a plurality of radially extending guides provided in said recess around said wheel and acting between said stator and each said ring to retain the latter against rotation and in coaxial relation to said wheel, whereby said ring is free to expand radially in said recess in response to temperature rise, said ring and the corresponding wheel having masses adapted to one another for simultaneous substantially equal radial expansions in response to temperature variations of the working gases during operation of the turbine.

2. In a gas turbine having a plurality of rotor wheels each comprising a single set of radially extending blades each secured at its root to said wheel and free at its external tip, whereby the channels defined between said blades are open at the rotor periphery between the free tips of the blades; a stator surrounding said wheels and provided with a recess around said wheels; a stationary ring for each wheel, each of said rings mechanically independent of the others having a root portion slidably mounted in said recess and a cylindrical smooth inner surface surrounding the free tips of the blades of the associate wheel with only a slight radial clearance, the rings associated with the wheels other than the first wheel counted in the direction of flow of the gases having each, further, a portion extending in the space between the associate wheel and the preceding one, said portion being provided with channels for the passage of the gases; and a plurality of radially extending guides spaced circumferentially in said recess around each of said wheels and acting between said stator and each of said rings to retain the latter against rotation and in coaxial relation to each wheel, whereby said rings are free to expand radially in response to temperature rise, each of said rings and the corresponding wheel having masses adapted to one another for simultaneous substantially equal radial expansions in response to temperature variations of the working gases during operation of the turbine.

ROGER JEAN IMBERT.

REFERENCES CITED

The following references are of record in the file of this patent:

UNITED STATES PATENTS

| Number | Name | Date |
|---|---|---|
| 1,525,804 | Doran | Feb. 10, 1925 |
| 1,666,625 | Losel | Apr. 17, 1928 |
| 1,692,537 | Baumann | Nov. 20, 1928 |
| 1,823,310 | Allen | Sept. 15, 1931 |
| 2,080,425 | Lysholm | May 18, 1937 |
| 2,220,616 | Roder | Nov. 5, 1940 |
| 2,304,994 | Franck | Dec. 15, 1942 |